US010490968B1

(12) United States Patent
Nicholson et al.

(10) Patent No.: US 10,490,968 B1
(45) Date of Patent: Nov. 26, 2019

(54) SELF-STARTING, PASSIVELY MODELOCKED FIGURE EIGHT FIBER LASER

(71) Applicant: OFS Fitel, LLC, Norcross, GA (US)

(72) Inventors: Jeffrey W Nicholson, Warren, NJ (US); Philip G Westergaard, Frederiksberg C (DK)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 16/200,810

(22) Filed: Nov. 27, 2018

Related U.S. Application Data

(60) Provisional application No. 62/673,219, filed on May 18, 2018.

(51) Int. Cl.
| | | |
|---|---|---|
| H01S 3/11 | (2006.01) |
| H01S 3/067 | (2006.01) |
| H01S 3/0941 | (2006.01) |
| H01S 3/16 | (2006.01) |
| H01S 3/094 | (2006.01) |
| H01S 3/108 | (2006.01) |

(52) U.S. Cl.
CPC ........ H01S 3/1112 (2013.01); H01S 3/06791 (2013.01); H01S 3/0941 (2013.01); H01S 3/094003 (2013.01); H01S 3/1086 (2013.01); H01S 3/1698 (2013.01); *H01S 3/161* (2013.01); *H01S 3/1608* (2013.01); *H01S 3/1616* (2013.01); *H01S 3/1618* (2013.01)

(58) Field of Classification Search
CPC .. H01S 3/1112; H01S 3/1698; H01S 3/06791; H01S 3/1086; H01S 3/161; H01S 3/094042

USPC .................................................... 372/18, 20
See application file for complete search history.

(56) References Cited

U.S. PATENT DOCUMENTS

| | | | | |
|---|---|---|---|---|
| 5,050,183 A | * | 9/1991 | Duling, III | H01S 3/06791 372/106 |
| 5,359,612 A | * | 10/1994 | Dennis | H01S 3/06791 372/18 |
| 5,365,531 A | | 11/1994 | Lin et al. | |
| 5,497,386 A | | 3/1996 | Fontana | |
| 5,577,057 A | * | 11/1996 | Frisken | H01S 3/1112 372/18 |
| 5,898,716 A | | 4/1999 | Ahn et al. | |

(Continued)

OTHER PUBLICATIONS

Grelu, Philippe et al., "Dissipative solitons for mode-locked lasers", Nature Photonics, vol. 6, Feb. 2012, pp. 1-10.

(Continued)

*Primary Examiner* — Tuan N Nguyen
(74) *Attorney, Agent, or Firm* — Wendy W. Kobe, Esq.

(57) ABSTRACT

A self-starting, passively modelocked figure-8 fiber laser is specifically configured to self-start into a low noise mode by controlling one or more operating parameters of the laser including, but not limited to, the coupling ratio between the uni-directional fiber loop and the bi-directional mirror loop, the accumulated dispersion within the figure-8 structure, and the amount of power present in the laser cavity. A self-starting passive modelocked figure-8 laser may also be made to self-start by initially increasing the pump current above its lasing threshold. Including a band-pass filter in the uni-directional loop has been found to ensure that the laser will enter a low noise lasing mode.

19 Claims, 4 Drawing Sheets

(56) References Cited

U.S. PATENT DOCUMENTS

| | | | |
|---|---|---|---|
| 6,163,630 A * | 12/2000 | Evans | H01S 3/067 |
| | | | 385/11 |
| 6,298,074 B1 | 10/2001 | Jeon et al. | |
| 6,636,674 B2 | 10/2003 | Kim et al. | |
| 7,817,674 B2 | 10/2010 | Nicholson | |
| 7,940,816 B2 * | 5/2011 | Nicholson | H01S 3/06791 |
| | | | 372/6 |
| 8,014,428 B2 | 9/2011 | Fleming et al. | |
| 8,654,799 B2 | 2/2014 | Simanovski et al. | |
| 8,873,601 B2 | 10/2014 | Haensel et al. | |
| 9,140,959 B2 | 9/2015 | Kieu et al. | |
| 9,276,372 B2 * | 3/2016 | Haensel | H01S 3/06791 |
| 9,735,533 B2 | 8/2017 | Barre et al. | |
| 9,819,141 B2 | 11/2017 | Fermann | |
| 2002/0106171 A1 * | 8/2002 | Kim | H01S 3/06791 |
| | | | 385/122 |
| 2013/0161295 A1 | 6/2013 | Tominaga | |
| 2018/0069369 A1 | 3/2018 | Jestin et al. | |
| 2018/0115136 A1 | 4/2018 | Delfyett et al. | |

OTHER PUBLICATIONS

Fedotov, Y.S. et al., "High average power mode-locked figure-eight Yb fibre master oscillator", Optics Express, Dec. 15, 2014, vol. 22, No. 25, pp. 31379-31386.

* cited by examiner ated, group velocity dispersion (GVD) of the figure-eight fiber laser based upon the accumulated dispersion associated with the sections of single mode fiber and the Raman fiber, and characteristics of the bandpass filter.
SELF-STARTING, PASSIVELY MODELOCKED FIGURE EIGHT FIBER LASER

CROSS-REFERENCE TO RELATED APPLICATIONS

This application claims the benefit of U.S. Provisional Application No. 62/673,219, filed May 18, 2018 and herein incorporated by reference.

TECHNICAL FIELD

The present invention relates to a fiber-based optical laser and, more particularly, to a passively modelocked figure eight fiber laser specifically configured to self-start into a low noise mode for ultra-short pulse generation.

BACKGROUND OF THE INVENTION

Fiber-based lasers are well known for their usefulness in generating ultra-short optical pulses. In particular, the use of a non-linear loop mirror (i.e., figure-8) design as a fast saturable absorber in a fiber-based laser cavity is a well-established technique for ultra-short pulse generation.

However, the figure-8 design typically requires the use of some type of external perturbation to kick-start the modelocked operation of the laser cavity as required for generating a continuous train of optical pulses. "Self-starting" operation (that is, avoiding the need for manual manipulation of the laser to initiate modelocking) usually requires additional functionality of some type, such as some sort of modulation at the cavity repetition rate, intentional design of the cavity architecture to include more rigorous phase control, or an additional pump diode to balance the gain between the two loops. To date, achieving self-starting modelocking without adding extra (typically expensive) components to the basic figure-8 design has been difficult to achieve.

Moreover, not all possible modes generated by modelocking within the figure-8 structure are equally desirable, and there have been instances where a figure-8 laser will modelock into an undesirable mode. For example, attempts at dispersion management within the fiber cavity (a desirable goal) may bring many different regimes and physical effects into play, producing pulses that behave as solitons, dissipative solitons, stretched pulses, similaritons, and the like. Some of these modes might be desirable in certain cases, while others will be unsuited, depending on the application. Moreover, there exist a large variety of modes that will lock, but display large variations in phase and amplitude from one roundtrip through the figure-8 laser cavity to the next (referred to as "noisy" modes). For most applications, pulses that are too variable in amplitude or repetition rate are not stable enough to be a pulse train source.

SUMMARY OF THE INVENTION

Various issues related to providing a self-starting figure-8 fiber laser are addressed by the present invention, which relates to a figure-8 fiber laser specifically configured to self-start into a low noise mode by controlling one or more operating parameters including, but not limited to, the coupling ratio between the two loops, the accumulated dispersion within the figure-8 structure, and the amount of power present in the cavity.

In accordance with one or more embodiments of the present invention, a self-starting passive modelocked figure-8 laser may also be made to self-start by initially increasing the pump power above its lasing threshold. Including a band-pass filter together with some source of loss (e.g., a tap coupler) in the uni-directional loop has been found to ensure that the laser will enter a low noise lasing mode.

An exemplary embodiment of the present invention takes the form of a passively modelocked figure-eight fiber laser comprising a uni-directional fiber loop and a bi-directional fiber loop mirror coupled together by a 2×2 central coupler disposed between the two loops to create a figure-eight configuration. The uni-directional fiber loop itself comprises the following elements: a section of rare-earth doped fiber, a section of single mode fiber coupled to the section of rare-earth doped fiber to form a fiber loop, an input coupler disposed at an input termination of the section of rare-earth doped fiber for introducing a pump beam into the rare-earth doped fiber for amplifying an optical signal propagating therethrough, an output coupler disposed along the section of single mode fiber for out-coupling optical pulses created by the passively modelocked figure-eight fiber laser and a bandpass filter disposed along the section of single mode fiber. The bi-directional fiber loop mirror itself comprises a section of single mode fiber and a section of Raman fiber coupled to the section of fiber to form a loop mirror. The figure-eight fiber laser is configured to self-start in a low noise mode by controlling one or more operating parameters selected from the group consisting of: the coupling ratio of the central coupler, the coupling ratio of the output coupler (i.e., the loss it contributes to the cavity, perhaps in combination with an additional lossy element), an accumulated, group velocity dispersion (GVD) of the figure-eight fiber laser based upon the accumulated dispersion associated with the sections of single mode fiber and the Raman fiber, and characteristics of the bandpass filter.

Other and further embodiments and advantages of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
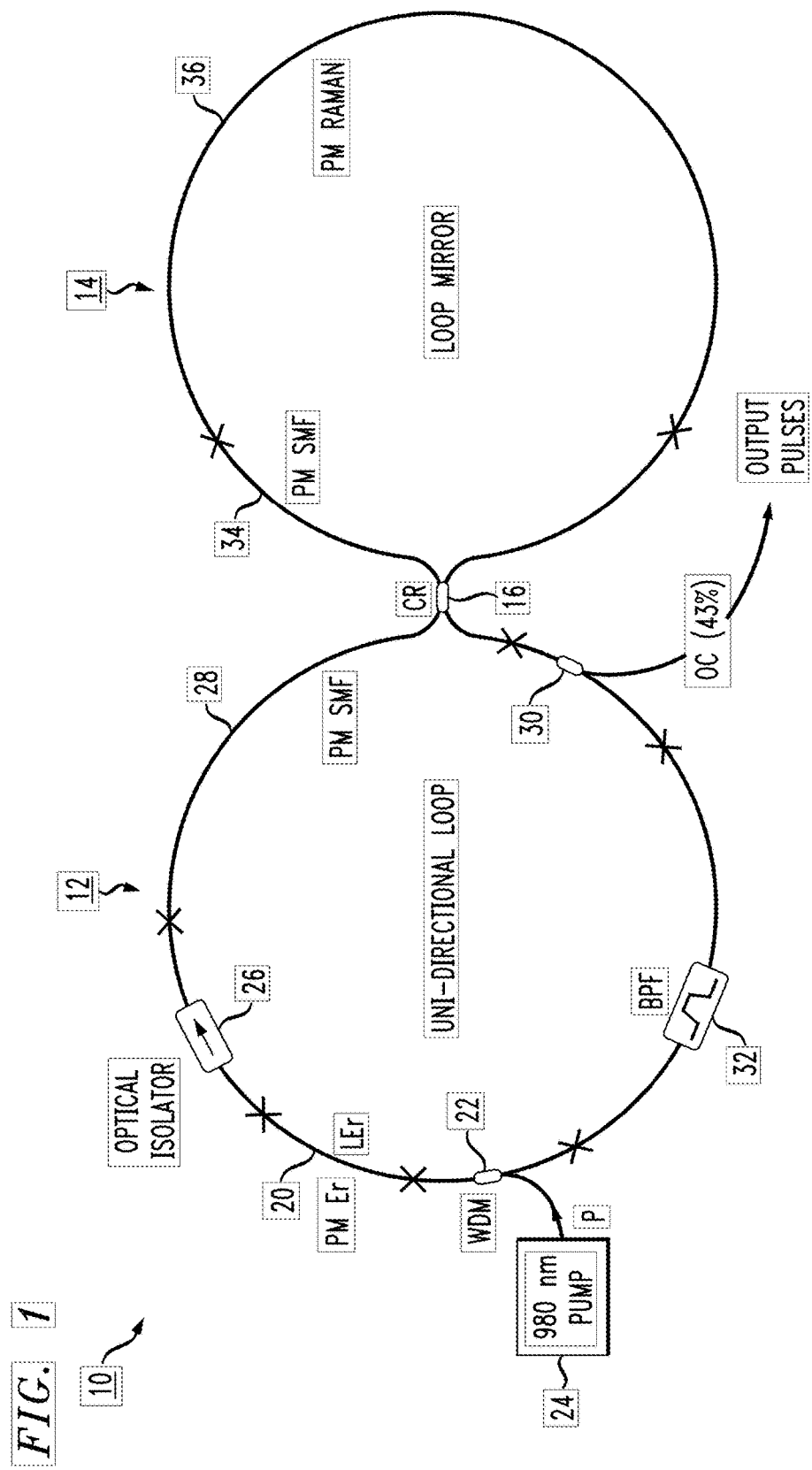
FIG. 1 is a diagram of an exemplary self-starting passively modelocked figure-8 fiber laser formed in accordance with the principles of the present invention.

FIG. 1 illustrates an exemplary self-starting passively modelocked figure-8 fiber laser 10 formed in accordance with the principles of the present invention. Figure-8 fiber laser 10 is shown as including a uni-directional loop 12 and a bi-directional loop 14 (hereinafter referred to as "loop mirror 14"). A 2×2 central coupler 16 is included and utilized to create pathways between loops 12 and 14. As will be described in detail below, the coupling ratio (CR) of central coupler 16 is one operating parameter that may be specifically configured (and controlled) to provide self-starting of a passively modelocked figure-8 fiber laser into a preferred low noise mode.

Uni-directional loop 12 is shown as including a section of rare-earth-doped gain fiber 20, with optical pump light P introduced into gain fiber 20 via a wavelength division multiplexer (WDM) 22 (other types of coupling arrangements other than a WDM may be used). Erbium is typically utilized as the rare-earth dopant for gain fiber, where pump light at a wavelength of 980 nm is known to provide the inversion required for introducing gain into an optical signal propagating through the gain fiber. It is to be understood, however, that gain fiber 20 may utilize other rare-earth dopants (including, but not limited to, Yb, Tm, Ho, and the like), where each interacts with pump light of a different wavelength, and thus produces output pulses at different wavelengths.

As known in the art, the introduction of pump light into a gain medium in the absence of a separate optical information signal results in the amplification of whatever optical noise is present in the gain fiber. The amplified noise circulates through the figure-8 structure and eventually mode locks to generate output pulses.

An optical isolator 26 is typically located at the output of gain fiber 20 to ensure that reflections within uni-directional loop 12 are minimized and the desired propagation direction of the pulses around loop 12 is maintained. The remainder of uni-directional loop 12 is formed of polarization-maintaining (PM) single mode fiber 28. An output coupler 30 is disposed along PM single mode fiber 26 to provide an exit for the ultra-short pulses created by figure-8 laser cavity 10.

Loop mirror 14 is shown as formed of a length of PM single mode fiber 34 coupled at either end to a long length of PM Raman fiber 36 (the Raman fiber typically having a length L in the range of tens of meters). Raman fiber is a specialty type of polarization-maintaining fiber that has a high index core region and a relatively small effective area. For the purposes of the present invention, Raman fiber 36 is utilized for its dispersion properties (on the order of about −20 ps/(nm–km) at a wavelength of 1550 nm). As discussed below, the length of Raman fiber 36 is one exemplary operating parameter that may be controlled to provide self-starting into a low noise mode by maintaining the accumulated dispersion value of the figure-8 structure within a defined range, as discussed below. It is to be noted that while various embodiments of the present invention utilize PM filter, as mentioned above and discussed in detail below, various embodiments may also be formed of non-PM (conventional) fiber. In this case, some polarization-related noise may be present in the output pulses and controlled through polarization-based filtering.

In accordance with the principles of the present invention, it has been found that by carefully mapping out the operating parameter space defining the figure-8 laser cavity, various sets of parameters provide a figure-8 laser configuration that will self-start into a low noise mode. As mentioned above, the coupling ratio (CR) of central coupler 16 is one of the parameters that may be controlled to promote the desired self-starting behavior of the figure-8 laser cavity. Fine-tuning this coupling ratio to find a balance between the gain in both loops promotes the self-starting behavior. In accordance with the principles of the present invention, it has been found that utilizing a central coupler with a CR in the range of 0.17 to 0.23 has been found to provide self-starting. These values for CR define the percentage of light coupled into one arm of loop mirror 14. In particular, 17-23% of light from uni-directional loop 12 is directed into one arm of loop mirror 14, with 83-77% of the light directed into the other arm of loop mirror 14.

In accordance with the principles of the present invention, the cavity loss is another variable in the operating parameter space that may be adjusted to provide low noise self-starting of a passively modelocked figure-8 fiber laser. It is typically convenient to tune the level of cavity loss by way of the coupling ratio (CR) of output coupler 30. While the embodiment illustrated in FIG. 1 shows a coupling value of 43% (0.43) for output coupler 30, an acceptable range of output coupler values spanning the range between 0.35 and 0.55 have been found acceptable.

As also shown in FIG. 1, a bandpass filter 32 is included within uni-directional loop 12. The presence of bandpass filter 32 has been found to favor modelocking into the desired "low noise" lasing mode of the cavity. The preference of a "low noise" self-starting figure-8 fiber laser is discussed in detail below in association with FIGS. 3-6. In particular, bandpass filter 32 is configured to have a relatively narrow bandwidth that encompasses the peak region of the gain profile associated with gain fiber 20. In particular, bandwidths in the range of 7-15 nm (with an exemplary preferable value of 10 nm) have been found acceptable.

Each section of optical fiber utilized in the formation of passively modelocked figure-8 fiber laser 10 exhibits a chromatic dispersion value, with some types of fiber exhibiting normal (negative) dispersion and others exhibiting anomalous (positive) dispersion. The cumulative dispersion value at various points in the laser cavity and for the complete fiber laser, defined as a group velocity dispersion (GVD), is another operating parameter that may be controlled in accordance with the present invention to provide self-starting into a preferred low noise mode. In particular, the lengths of selected fiber sections may be adjusted to modify the amount of dispersion contributed by that section. For example, the length of Raman fiber 36 may be particularly chosen to provide a desired amount of dispersion. In turn, this local change in dispersion changes the GVD value, which may shift to a value associated with the ability to self-start. Specifically, it has been found that for a total GVD having a value in the range of 0.27 to 0.30 $ps^2$ (in some cases, up to 0.42 $ps^2$), the cavity design as shown in FIG. 1 goes into low noise modelocking for the range of CR values discussed above (i.e., 0.17-0.23).

Additionally, it has been found that, the initial optical power level of pump light P as provided by pump source 24 is another parameter that may be adjusted in accordance with the present invention to provide self-starting of the passive modelocked operation of figure-8 fiber laser 10. In particular, it has been found that using a relatively high pump power in the range of about 300-400 mW (i.e., well above the threshold required for pump source to emit a light beam) will provide self-starting of the figure-8 laser cavity without requiring any other perturbations to the system. Once the laser activity has started, the pump power is reduced to a lower level better suited for low noise operation.

Figure 2:
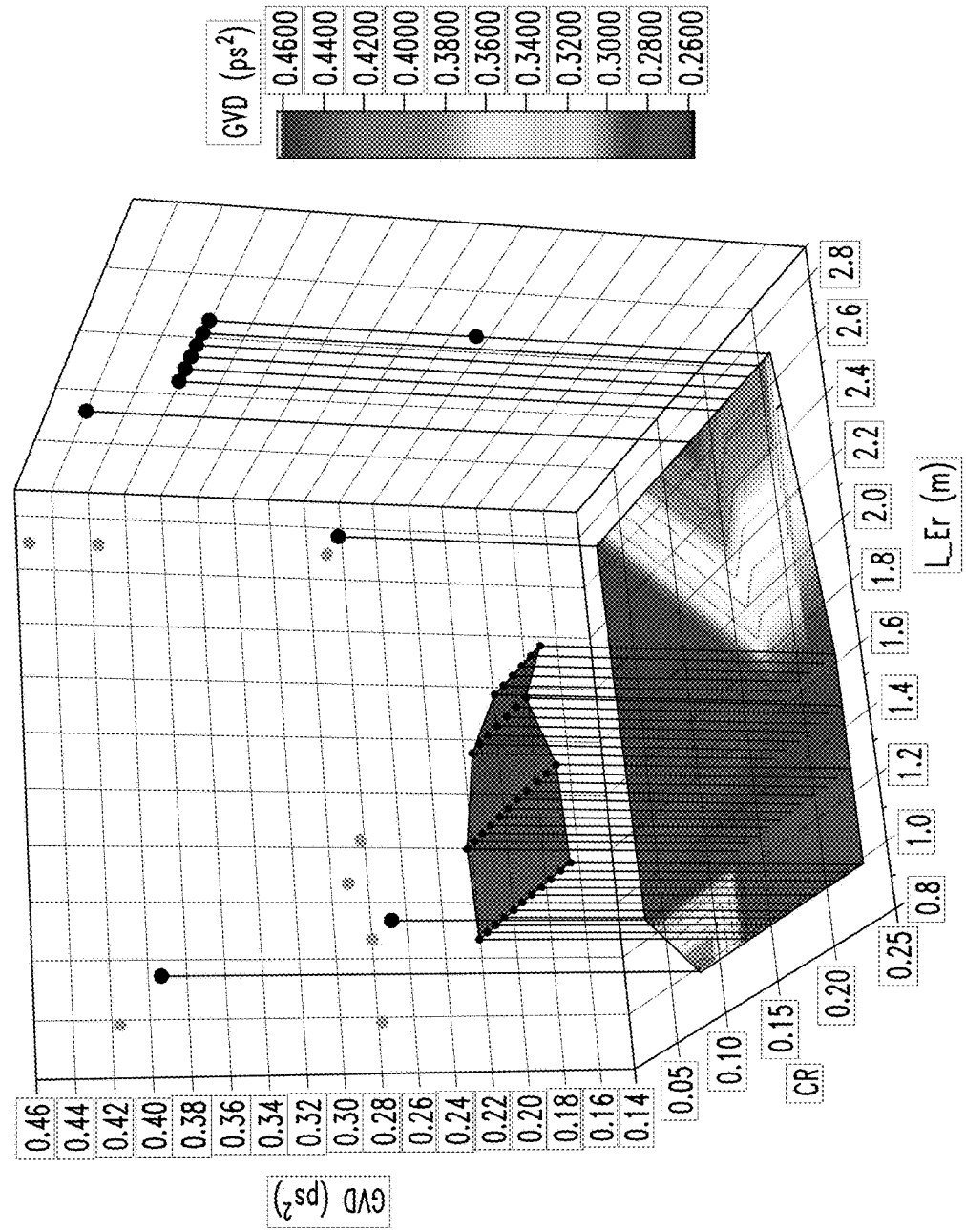
FIG. 2 plots a surface map illustrating an exemplary intersection of a set of three operating parameters (gain fiber length, coupling ratio (CR) between the two loops, and total cavity group velocity dispersion (GVD)) that have been found to provide self-starting for a figure-8 fiber laser.

FIG. 2 maps an exemplary operating parameter space where figure-8 fiber laser 10 of FIG. 1 displays self-starting modelocking. In particular, FIG. 2 plots ranges of three selected operating parameters (length of gain fiber 20, CR values of central coupler 16, and total GVD of fiber laser 10) where the configuration will self-start. The operating parameter space includes both two-dimensional surface maps and specific points in three-dimensional space where self-starting behavior is possible. The black dots of FIG. 2 are associated with the specific 3D points, with the gray dots show the projection of these operating points onto the GVD—"length of gain fiber" plane. Outside the illustrated surface and points, the locking is either too noisy or does not occur.

While the complete operating parameter space as illustrated in FIG. 2 will permit self-starting, it has been found that some sets of specific parameters lock in on unacceptable modes. For example, a given mode may be too noisy for use in generating narrow, reliable pulses.

Figure 3:
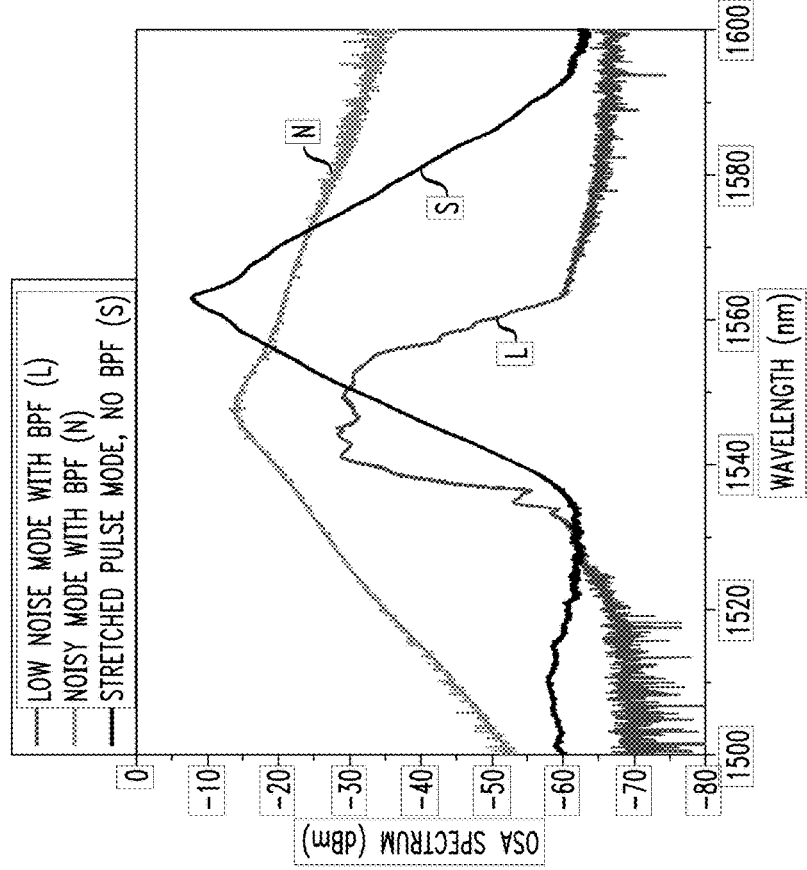
FIG. 3 is a graph of spectral plots for three different lasing modes, illustrating the ability to provide self-starting by proper cavity parameter selection.

FIG. 3 graphs the spectra of three different lasing modes that have all been creating by using a self-starting set of parameters selected from the operating parameter space shown in FIG. 2. A first lasing mode, identified as graph N in FIG. 3, is associated with a lasing mode that is too noisy for generating output pulses with a stable amplitude. FIG. 4(a) is a graph of a time series of pulses generated by the parameters associated with graph N of FIG. 3 and shows the extreme variation in amplitude, an unacceptable result.

Graph S in FIG. 3 shows a pulse with an improved amplitude stability over that of the noisy mode depicted in graph N, but the set of parameters associated with the laser mode of this stretched pulse was found to exhibit a power-dependent pulse duration, again an unacceptable result. A time series plot of output pulses associated with the stretched pulse configuration is shown in FIG. 4(b).

Graph L in FIG. 3 illustrates the lasing mode of a low noise pulse provided by a modelocked figure-8 laser configured with a set of optimum parameters in accordance with the principles of the present invention. Here, the pulses exhibit the desired short duration and exhibit a stable amplitude. The latter is particularly illustrated in the plot of FIG. 4(c).

Figure 5:
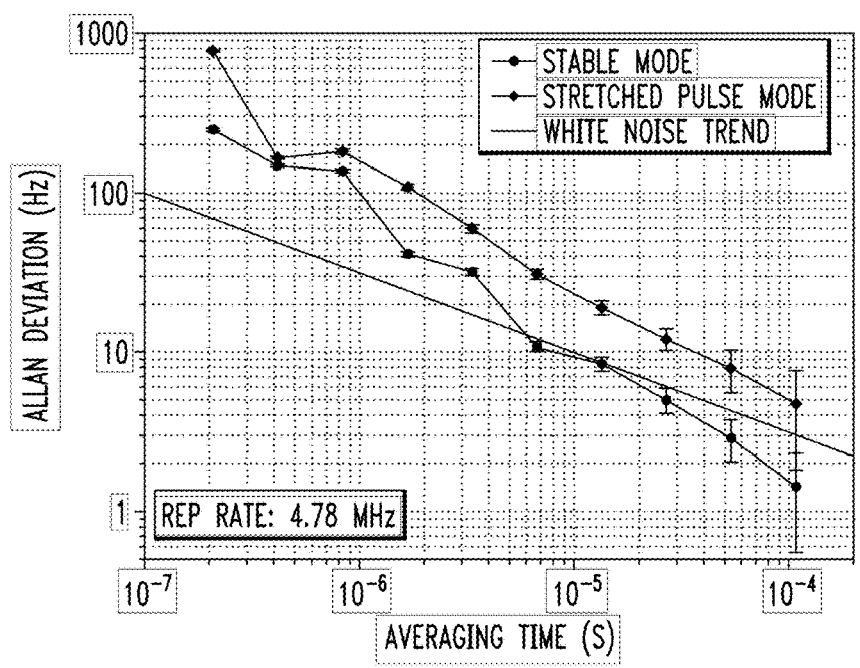
FIG. 5 is a logarithmic plot of the Allan deviation of the repetition rate for two different modes of a figure-8 cavity.
Figure 6:
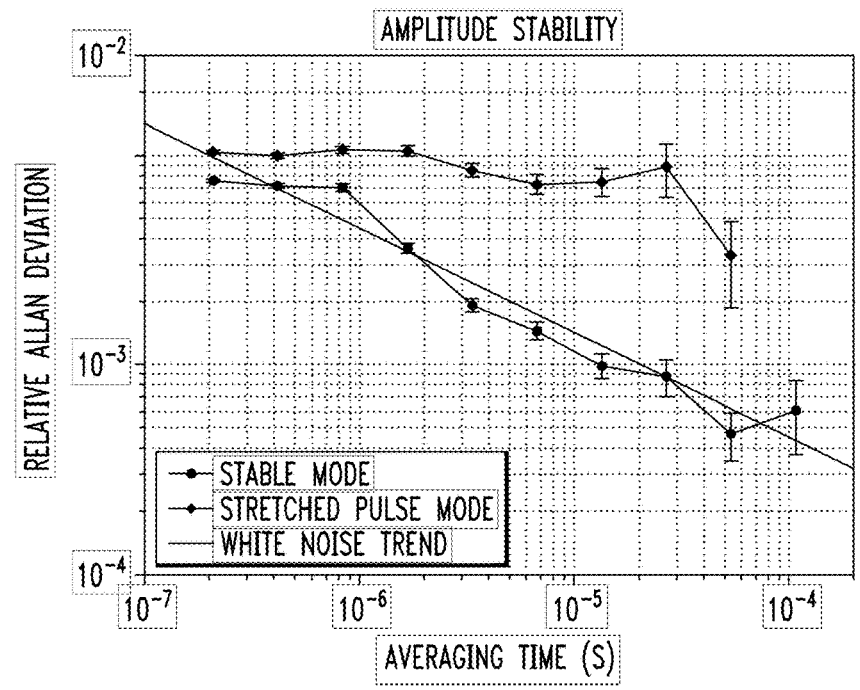
FIG. 6 is a logarithmic plot of the relative Allan deviation of the pulse amplitude for the same two modes as depicted in FIG. 5.

In terms of stability, the preferred low noise mode displays a performance characterized by the Allan deviation, shown in FIGS. 5 and 6 for "repetition rate" and "pulse amplitude", respectively. The Allan deviation is defined as the square-root of the Allan variance. In contrast to a conventional standard variance where measured values are compared against a common (mean) value of the total data set, the Allan variance is a two-sample variance defined as one-half of the time average of the differences between successive readings of the measurement deviation sampled over the sampling period ("averaging time"). For the purposes of understanding the plots of FIGS. 5 and 6, the Allan variance (and, similarly, the Allan deviation) is therefore based on measurement-to-measurement variation from one pulse arrival time to the next (FIG. 5), or one amplitude value to the next (FIG. 6). These plots are both log-log plots.

Figure 4:
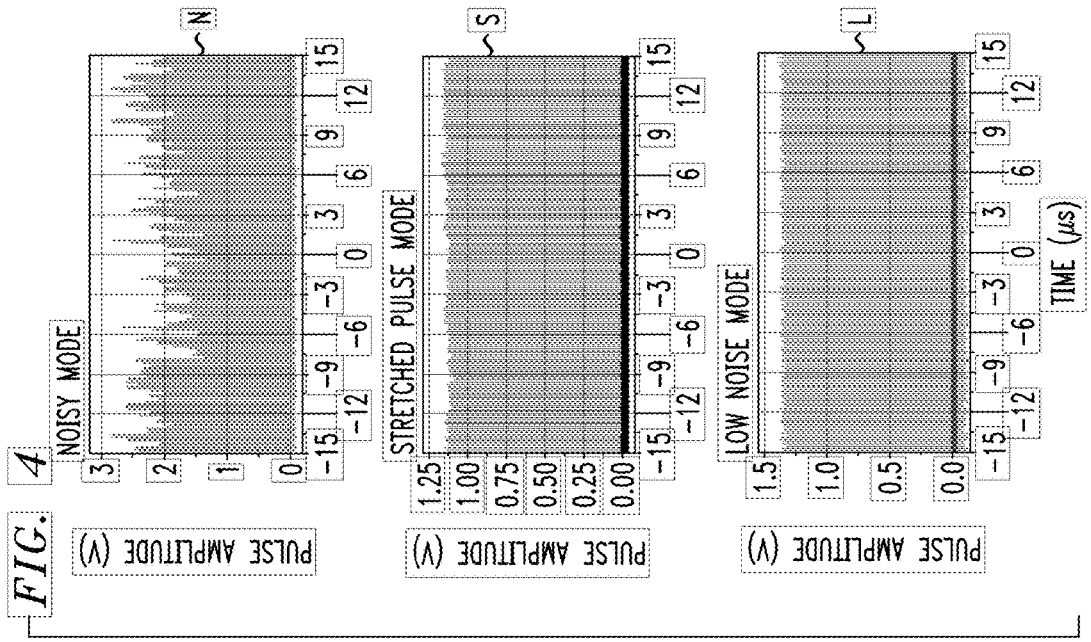
FIG. 4 contains a set of three corresponding time series of output pulses associated with the three lasing modes of FIG. 3.

In particular, FIG. 5 illustrates the Allan deviation in repetition rate for the fiber laser parameters associated with the "stretched" pulse configuration (graph S of FIG. 4) and the "low-noise" pulse configuration (graph L of FIG. 4). The Allan deviation (measured in Hz) is plotted as a function of averaging time (in seconds). The white noise trend W is also plotted in FIG. 5. This plot clearly shows that the preferred low noise self-starting configuration exhibits less deviation than the stretched pulse self-starting configuration. Indeed, the trend of the preferred embodiment provides results that are an improvement over the stretched pulse baseline.

The relative Allan deviation associated with amplitude stability as shown in FIG. 6 clearly illustrates the preferred results associated with the low noise embodiment, which is to be expected inasmuch as the amplitude of the output pulses was shown to exhibit a significant level of stability (see the graph of FIG. 4(c)). It is also noted that the relative Allan deviation of the low noise embodiment follows a white noise characteristic, in contrast to the stretched pulse which more closely resembles flicker noise (i.e., "pink" noise).

Summarizing, it has been found that including a bandpass filter and relatively large loss in the cavity (such as loss associated with the output coupler) can result in the configuration entering into a low noise lasing mode. The interplay between loss, dispersion, relative change in dispersion (e.g., changing the position/order of components), coupling ratio between the loops, lengths of the various fiber sections, and the introduction of a bandpass filter can be engineered such that a low noise mode will be dominant for a range of pump current/power above the pump lasing threshold. Various ones of the fiber sections may be formed of polarization-maintaining fiber, thus eliminating the need to provide additional polarization controlling in the laser.

It will be apparent to those skilled in the art that various modifications and variations can be made to the present invention without departing from the spirit or scope thereof. Thus, it is intended that the present invention cover the modifications and variations of the above-described embodiments, all of which are considered to fall within the spirit and scope of the invention as the defined by the claims appended hereto.

What is claimed is:

1. A passively modelocked figure-eight fiber laser comprising a uni-directional fiber loop and a bi-directional fiber loop mirror coupled together by a 2×2 central coupler to create a figure-eight configuration,
   the uni-directional fiber loop comprising:
      a section of rare-earth doped fiber;
      a section of single mode fiber coupled to the section of rare-earth doped fiber to form a fiber loop;
      an input coupler disposed at an input termination of the section of rare-earth doped fiber for introducing a pump beam into the rare-earth doped fiber for amplifying an optical signal propagating therethrough;
      an output coupler disposed along the section of single mode fiber for out-coupling optical pulses created by the passively modelocked figure-eight fiber laser; and
      a bandpass filter disposed along the section of single mode fiber;
   the bi-directional fiber loop mirror comprising:
      a section of single mode fiber; and
      a section of Raman fiber coupled to the section of single mode fiber to form a loop mirror, the section of Raman fiber having a predetermined length L selected to impart a known dispersion value to the optical signal propagating therethrough;
   the 2×2 central coupler defined by a coupling ratio and configured to self-start into a passively modelocked low noise mode for generating optical pulses as an output, the figure-eight fiber laser further configured to self-start in a low noise mode by controlling one or more operating parameters selected from the group consisting of: the coupling ratio of the 2×2 central coupler, the coupling ratio of the output coupler, an accumulated, group velocity dispersion (GVD) of the figure-eight fiber laser based upon the accumulated dispersion associated with the sections of single mode fiber and the Raman fiber, and characteristics of the bandpass filter.

2. The passively modelocked figure-eight fiber laser as defined in claim 1 wherein the group of operating parameters further includes an initial drive current applied to a pump laser diode to deliver an initial high power pump input to the rare-earth doped gain fiber.

3. The passively modelocked figure-eight fiber laser as defined in claim 2 wherein the pump input exhibits an initial power in the range of 300-400 mW.

4. The passively modelocked figure-eight fiber laser as defined in claim 1 wherein the fiber laser further comprises an optical isolator disposed at the output of the section of gain fiber within the uni-directional fiber loop.

5. The passively modelocked figure-eight fiber laser as defined in claim 1 wherein the directional coupler is configured to exhibit a coupling ratio within the range of 0.17 to 0.23.

6. The passively modelocked figure-eight fiber laser as defined in claim 1 wherein the output coupler is configured to exhibit a coupling ratio within the range of 0.35 to 0.55.

7. The passively modelocked figure-eight fiber laser as defined in claim 1 wherein the GVD is within the range of 0.27 to 0.42 $ps^2$.

8. The passively modelocked figure-eight fiber laser as defined in claim 7 wherein the GVD is within the range of 0.27 to 0.30 $ps^2$.

9. The passively modelocked figure-eight fiber laser as defined in claim 1 wherein the bandpass filter is configured to exhibit a bandwidth in a range of 7-15 nm, centered close to a peak of a gain profile of the section of rare-earth doped fiber.

10. The passively modelocked figure-eight fiber laser as defined in claim 9 wherein the bandpass filter is configured to exhibit a bandwidth of about 10 nm, centered close to the peak of the gain profile of the section of rare-earth doped fiber.

11. The passively modelocked figure-eight fiber laser as defined in claim 1 wherein the input coupler comprises a wavelength division multiplexer.

12. The passively modelocked figure-eight fiber laser as defined in claim 11 wherein the section of rare-earth doped gain fiber includes Er as the dopant, and the pump input operates at a wavelength of 980 nm.

13. The passively modelocked figure-eight fiber laser as defined in claim 1 wherein the section of rare-earth doped gain fiber includes a dopant selected from the group consisting of: Er, Yb, Tm and Ho.

14. The passively modelocked figure-eight fiber laser as defined in claim 1 wherein the section of Raman fiber has a length L in excess of ten meters.

15. The passively modelocked figure-eight fiber laser as defined in claim 1 wherein the section of rare-earth doped gain fiber has a length LR in the range of one to two meters.

16. The passively modelocked figure-eight fiber laser as defined in claim 1 wherein the directional coupler is configured to exhibit a coupling ratio within the range of 0.17 to 0.23, the output coupler is configured to exhibit a coupling ratio within the range of 0.35 to 0.55, and the GVD is within the range of 0.27 to 0.30 $ps^2$.

17. The passively modelocked figure-eight fiber laser as defined in claim 1 wherein the uni-directional fiber loop comprises a section of rare-earth doped polarization-maintaining fiber and a section of polarization-maintaining single mode fiber.

18. The passively modelocked figure-eight fiber laser as defined in claim 1 wherein the bi-directional fiber loop mirror comprises a section of polarization-maintaining single mode fiber and a section of polarization-maintaining Raman fiber.

19. The passively modelocked figure-eight fiber as defined in claim 1, wherein
the uni-directional fiber loop comprises a section of rare-earth doped polarization-maintaining fiber and a section of polarization-maintaining single mode fiber; and
the bi-directional fiber loop mirror comprises a section of polarization-maintaining single mode fiber and a section of polarization-maintaining Raman fiber.

* * * * *